Figure 1:
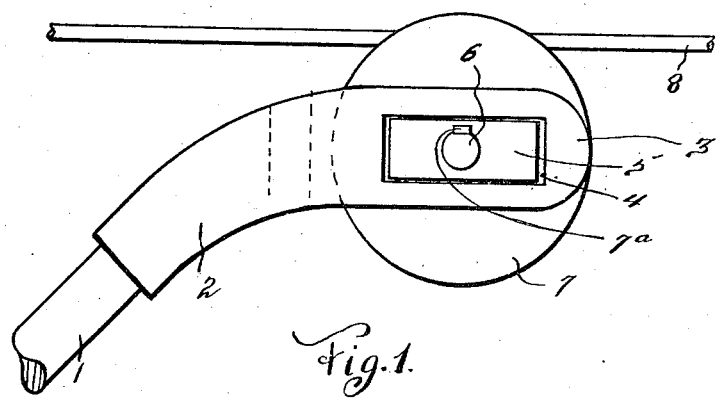

S. H. SMITH.
TROLLEY.
APPLICATION FILED MAR. 14, 1910.

966,255.

Patented Aug. 2, 1910.

WITNESSES

INVENTOR
S. H. Smith,
By

UNITED STATES PATENT OFFICE.

SAMUEL H. SMITH, OF PITTSBURG, PENNSYLVANIA.

TROLLEY.

966,255.  Specification of Letters Patent.  Patented Aug. 2, 1910.

Application filed March 14, 1910. Serial No. 549,216.

*To all whom it may concern:*

Be it known that I, SAMUEL H. SMITH, a citizen of the United States of America, residing at Pittsburg, in the county of Allegheny and State of Pennsylvania, have invented certain new and useful Improvements in Trolleys, of which the following is a specification, reference being had therein to the accompanying drawing.

This invention relates to trolleys, and the objects of my invention are to provide a trolley that cannot become accidentally displaced from a trolley wire or electric conductor, and to furnish a trolley pole with a novel harp for adjustably supporting the trolley wheel.

Further objects of my invention are to provide a trolley wheel that will adjust itself to the curvature of a wire and any irregularities in the same, and to accomplish the above results by a trolley that is simple in construction, durable, composed of comparatively few parts easily and quickly assembled, and highly efficient for the purposes for which it is intended.

These and such other objects as may hereinafter appear are attained by the novel construction, combination and arrangement of parts to be hereinafter specifically described and then claimed.

Reference will now be had to the drawing forming a part of this specification, wherein there is illustrated a preferred embodiment of the invention, but it is to be understood that the structural elements thereof can be varied or changed without departing from the spirit and scope of the invention within the scope of the appended claim.

Figure 2:
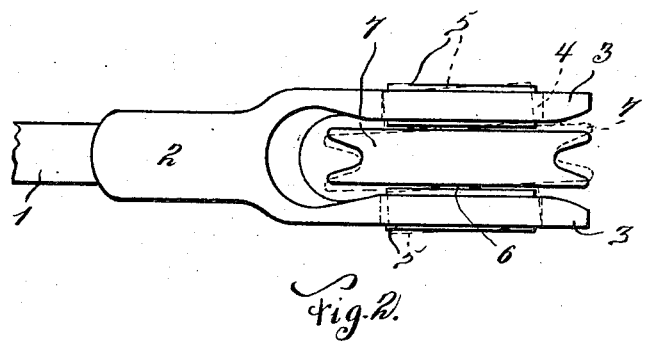
Figure 3:
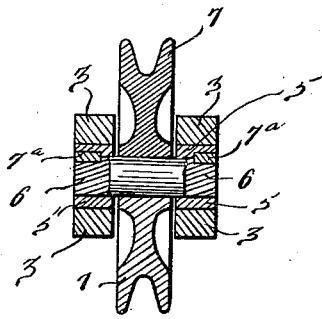

In the drawing:—Figure 1 is a side elevation of the trolley, Fig. 2 is a plan of the same, and Fig. 3 is a cross sectional view of the trolley.

In the accompanying drawing the reference numeral 1 denotes the upper end of a trolley pole and suitably mounted upon the pole is the cylindrical angular end 2 of a horizontal harp, comprising parallel arms 3, said arms having oppositely disposed oblong openings or slots 4 formed therein intermediate the ends of said arms.

5 denotes oblong blocks movably mounted in the openings or slots 4, and connecting said blocks intermediate the ends thereof is a transverse pin 6, said pin being keyed within the blocks by keys 7ª. Revolubly mounted upon the pin 6 between the blocks is a trolley wheel 7 adapted to travel upon a trolley wire 8.

By making the blocks 5 of a less length than the openings or slots 4 and the trolley wheel 7 of a less width than the space between the arms 3, the trolley wheel can shift between the arms 3, as indicated by dotted lines in Fig. 2, thereby allowing the trolley wheel to adjust itself to the curvature of a trolley wire or any irregularities in the same, thus avoiding any tendency of the trolley wheel to bind and ride upon the flanges of the trolley wheel when said wheel is moving around a curve.

Having now described my invention what I claim as new, is:—

The combination with a trolley pole, of a harp having an angularly-disposed end mounted upon said pole and further including a pair of parallel arms extending in a horizontal plane parallel to the trolley wire, each of said arms provided with a rectangular opening, rectangular blocks mounted in and of less length than said openings, a pin connecting said blocks together, keys for securing the pin to said blocks, and a trolley wheel revolubly mounted upon said pin between said blocks.

In testimony whereof I affix my signature in the presence of two witnesses.

SAMUEL H. SMITH.

Witnesses:
 KARL H. BUTLER,
 JOHN S. STEPHANY.